C. F. ADAMSON.
APPARATUS FOR VULCANIZING TIRE SHOES.
APPLICATION FILED JULY 19, 1912. RENEWED JAN. 15, 1915.
1,150,922.
Patented Aug. 24, 1915.
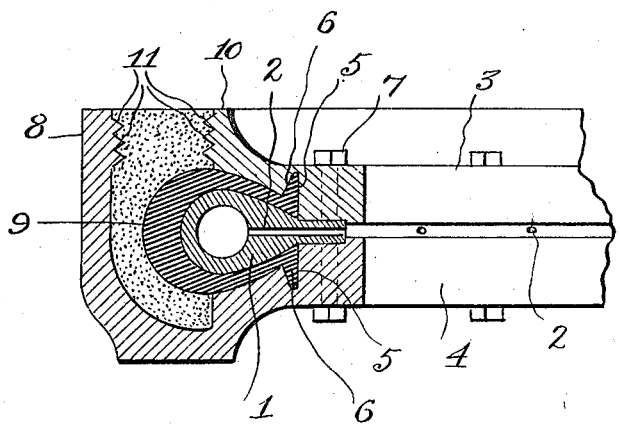

UNITED STATES PATENT OFFICE.

CECIL F. ADAMSON, OF EAST PALESTINE, OHIO, ASSIGNOR TO UNITED STATES RUBBER COMPANY, A CORPORATION OF NEW JERSEY.

APPARATUS FOR VULCANIZING TIRE-SHOES.

1,150,922.  Specification of Letters Patent.  Patented Aug. 24, 1915.

Application filed July 19, 1912, Serial No. 710,441. Renewed January 15, 1915. Serial No. 2,495.

*To all whom it may concern:*

Be it known that I, CECIL F. ADAMSON, a citizen of the United States, residing at East Palestine, in the county of Columbiana, State of Ohio, have invented new and useful Improvements in Apparatus for Vulcanizing Tire-Shoes, of which the following is a specification.

This invention relates to rubber articles and more particularly apparatus for vulcanizing rubber articles, and more particularly the outer shoes or casings of pneumatic tires, and has for its object to provide certain improvements in the same as will be hereinafter more definitely pointed out and claimed.

Heretofore tire shoes or casings have been vulcanized in one of two ways, viz., by subjecting the built up article to the vulcanizing heat while clamped in a metal mold encompassing the entire tire; or by wrapping the built up article in a textile covering under considerable tension, whereby the rubber composing the tread surface of the tire will be prevented from running under the softening action of the heat before the vulcanizing temperature is reached. Of these methods the first is objectionable because of the fact that the gases in the rubber compound liberated by the vulcanizing heat are trapped by the metal mold in which the shoe is clamped, thereby causing blisters to form on the surface of the shoe; while in the method using textile wrappings the cost is objectionable, the method requiring highly skilled labor and constantly destroying the textile wrappings.

My present invention aims to eliminate the objectionable features of both of the above described methods, which I accomplish by substituting for the metal mold in the one instance, and the textile wrappings in the other instance, a support of comminuted material which will be unaffected by the vulcanizing heat, such as molders' sand, powdered soapstone, or similar material, the same preferably surrounding the tread surface of the tire only, and which will act not only to maintain the rubber compound in its shape under the gradually increasing heat in the vulcanizer, but will also permit the escape of any gases generated therein under the vulcanizing heat.

In the drawing accompanying this specification, the figure is a vertical sectional view of my improved apparatus.

In the said drawing the reference numeral 1 denotes a suitable metal core upon which the carcass of the tire shoe is first built up, and which may be formed hollow, as shown, to permit access thereinto of the vulcanizing medium through a series of apertures 2 therein.

In conjunction with said core 1 I employ an upper clamping member 3 and an under clamping member 4, the same being shown of suitable form for vulcanizing tire shoes of the "clencher" type, having channels 5 therein of suitable shape to receive, form and give shape to the beads or ribs 6 at the margins of this type of tire shoe. Said clamping members are suitably clamped together by means of bolts 7 and the lower member 4 is extended annularly at 8 to form a pocket surrounding the tread surface 9 of the tire shoe, the upper edge of said extension 8 being flush with the upper edge of the extension 10 of clamping member 3, as shown.

In practice the built up tire shoe is positioned between the members 3 and 4, which are then clamped together by means of the bolts 7, which will clamp and shape the beads or ribs 6 of the shoe as well as the body of the shoe for a short distance in the usual manner. The pocket formed by the extensions 8 and 10 is then filled with any suitable comminuted material, preferably molders' sand, which is tamped in the usual manner and brought flush with the upper edges of the extensions 8 and 10 when the apparatus is ready for insertion into the vulcanizer. The sand thus surrounding the tread surface of the shoe being cured will most effectually maintain the rubber compound against movement or running, as the rise in temperature initially softens the same, while it will also permit the escape of any gases liberated in the rubber.

If desired, I may provide the inner surfaces of the extensions 8 and 10 near their upper edges with a series of annular flanges 11, whose purpose is to aid in retaining the sand or other material within the chamber.

In employing the term "comminuted material" in the claims hereto appended I wish to be understood as embracing any form of finely divided material which will be unaffected by the vulcanizing medium and which will maintain the rubber compound composing the tire shoe tread in form under the vulcanizing operation.

Having thus described my invention, what I claim as new and desire to secure by Letters Patent is:

1. In apparatus of the character described, means for holding and supporting a tire shoe or casing in the form to be permanently held thereby, but leaving the tread portion thereof exposed, and a packing of comminuted material for enveloping and supporting said tread surface.

2. In apparatus of the character described, a core adapted for insertion within a tire shoe or casing, means for clamping the margins of said casing in proper relation to said core while leaving the tread thereof exposed, and a packing of comminuted material applied to said tread surface to support the same during the vulcanizing operation.

3. In apparatus of the character described, a core adapted for insertion within a tire shoe or casing, coöperating members for clamping the margins of said casing in proper relation to said core while leaving the tread surface thereof exposed, an extension on one of said members forming a pocket inclosing said exposed tread surface, and a packing of comminuted material in said pocket and in contact with said tread surface to support the latter in form under the vulcanizing operation.

4. In apparatus of the character described, a core adapted for insertion within a tire shoe or casing, coöperating members for clamping the margins of said casing in proper relation to said core while leaving the tread surface thereof exposed, an extension on one of said members forming a pocket around said tread surface, a coöperating extension on said other member, and a packing of comminuted material in said pocket and in contact with said tread to support the latter in form under the vulcanizing operation.

In testimony whereof, I have hereunto set my hand in the presence of two subscribing witnesses.

CECIL F. ADAMSON.

Witnesses:
EVERETT L. LYON,
CLARA L. MORROW.

Copies of this patent may be obtained for five cents each, by addressing the "Commissioner of Patents, Washington, D. C."